F. WHIGHAM.
ANIMAL POKE.
APPLICATION FILED SEPT 18, 1920.
1,377,299.
Patented May 10, 1921.
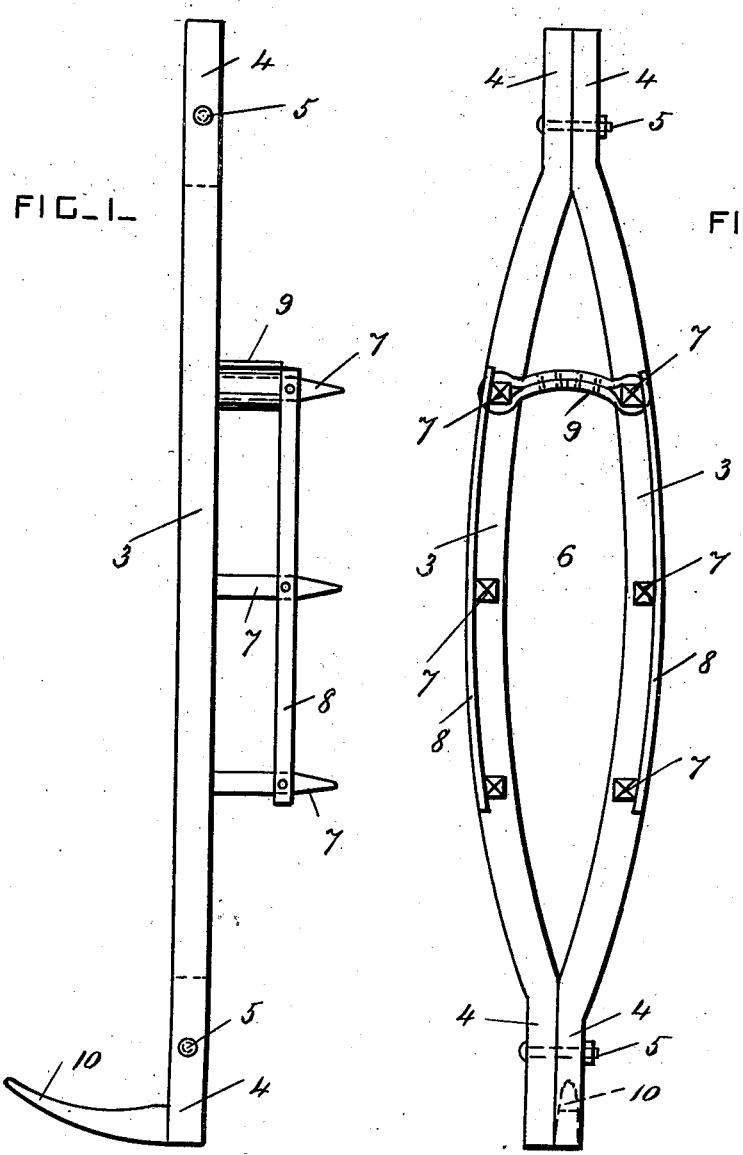

UNITED STATES PATENT OFFICE.

FRANK WHIGHAM, OF KINSTON, ALABAMA.

ANIMAL-POKE.

1,377,299.  Specification of Letters Patent.  Patented May 10, 1921.

Application filed September 18, 1920. Serial No. 411,151.

*To all whom it may concern:*

Be it known that I, FRANK WHIGHAM, a citizen of the United States residing at Kinston, in the county of Coffee and State of Alabama, have invented certain new and useful Improvements in Animal-Pokes, of which the following is a specification.

This invention relates to pokes adapted to be attached to the necks of cows and other similar animals to prevent them from jumping fences; and it consists in the novel construction and combination of the parts hereinafter fully described and claimed.

In the drawings, Figure 1 is a side view of an animal poke constructed according to this invention. Fig. 2 is a rear view of the same.

A frame is provided and is formed of two curved bars 3 having parallel end portions 4 which are secured together by bolts 5 or other fastening devices. A space 6 for the neck of the animal is formed between the two curved bars. A series of spikes 7 is arranged to project rearwardly from each curved frame bar, and curved guard bars 8 are secured to the middle parts of the spikes substantially parallel to the frame bars. The spikes terminate in points.

A yoke or neck piece 9 of flexible material is secured to the top spikes, and extends crosswise of the space between the frame bars. The yoke 9 is preferably formed of leather, and its end portions are arranged to inclose the front end portions of the spikes between the frame bars and the guard bars. The lower end portion of the frame is provided with a forwardly projecting member or hook 10.

Additional fastenings may be used, if necessary, to retain the poke on the neck of the animal. The spikes prevent the animal from pushing its way through all kinds of obstacles, and the guard bars prevent the spikes from injuring the shoulders of the animal. The hook 10 will catch in fence rails and other similar objects, and will restrain the animal from jumping them.

What I claim is:

1. An animal poke, comprising two curved frame bars having their end portions secured together, said bars having a neck space between them, spikes projecting rearwardly from the said bars, and a neck piece of flexible material secured to two of the spikes and extending across the neck space.

2. An animal poke, comprising two curved frame bars having their end portions secured together, said bars having a neck space between them, a series of spikes projecting rearwardly from each frame bar, curved guard bars secured to the middle parts of the spikes and arranged substantially parallel to the frame bars, and a neck piece of flexible material secured to the two uppermost spikes and arranged between the frame bars and the guard bars and extending across the neck space.

In testimony whereof I have affixed my signature.

FRANK WHIGHAM.